United States Patent [19]

Blanar

[11] 4,273,484
[45] Jun. 16, 1981

[54] QUICK RELEASE WINCH TIE DOWN AND RAMP ASSEMBLY

[75] Inventor: Gregory G. Blanar, Marietta, Ga.

[73] Assignee: Bankhead Enterprises, Inc., Atlanta, Ga.

[21] Appl. No.: 57,826

[22] Filed: Jul. 16, 1979

[51] Int. Cl.³ .......................... B60P 3/06; B60P 7/08; B61D 45/00; B66D 1/04
[52] U.S. Cl. ..................................... 410/12; 74/506; 410/100; 410/103
[58] Field of Search ............... 254/149, 161, 163, 164, 254/186 HC; 410/12, 100, 103; 74/506

[56] References Cited

U.S. PATENT DOCUMENTS

| 994,286 | 6/1911 | Swartzwelder | 254/149 |
|---|---|---|---|
| 1,599,675 | 9/1926 | O'Connor | 254/149 |
| 3,038,740 | 6/1962 | Blunden | 410/12 |
| 3,157,133 | 11/1964 | Wojcikowski | 410/12 |
| 3,187,686 | 6/1965 | DePodesta | 410/12 |
| 3,205,834 | 9/1965 | Terlecky | 410/103 |
| 3,374,008 | 3/1968 | Blunden et al. | 410/12 |
| 3,673,969 | 7/1972 | Peisner et al. | 410/12 |
| 3,685,856 | 8/1972 | Blunden | 410/12 |
| 3,860,263 | 1/1975 | Taylor | 410/12 |

Primary Examiner—Randolph A. Reese
Assistant Examiner—Howard Beltran
Attorney, Agent, or Firm—Jones, Thomas & Askew

[57] ABSTRACT

A quick release winch tie down assembly is mounted in the tracks of a ramp of a car hauler vehicle and includes a crank shaft extending from one end through a segmented bearing sleeve, a release shaft connected to said crank shaft in nonrotatable telescopic arrangement, and a tie down sleeve extending about both the release shaft and crank shaft in a space between the bearing sleeve segments. A spring urges lock elements of the tie down sleeve and the release shaft in locking relationship. A tie down chain is connected at one end portion to the tie down sleeve, and a rachet and pawl means limits the rotation of crank shaft to one direction, so that when the crank shaft is rotated it also rotates the release shaft and tie down sleeve and winds the tie down chain about the tie down sleeve, and when the lock elements are disengaged, the tie down sleeve is free to rotate and unreel the tie down chain.

14 Claims, 8 Drawing Figures

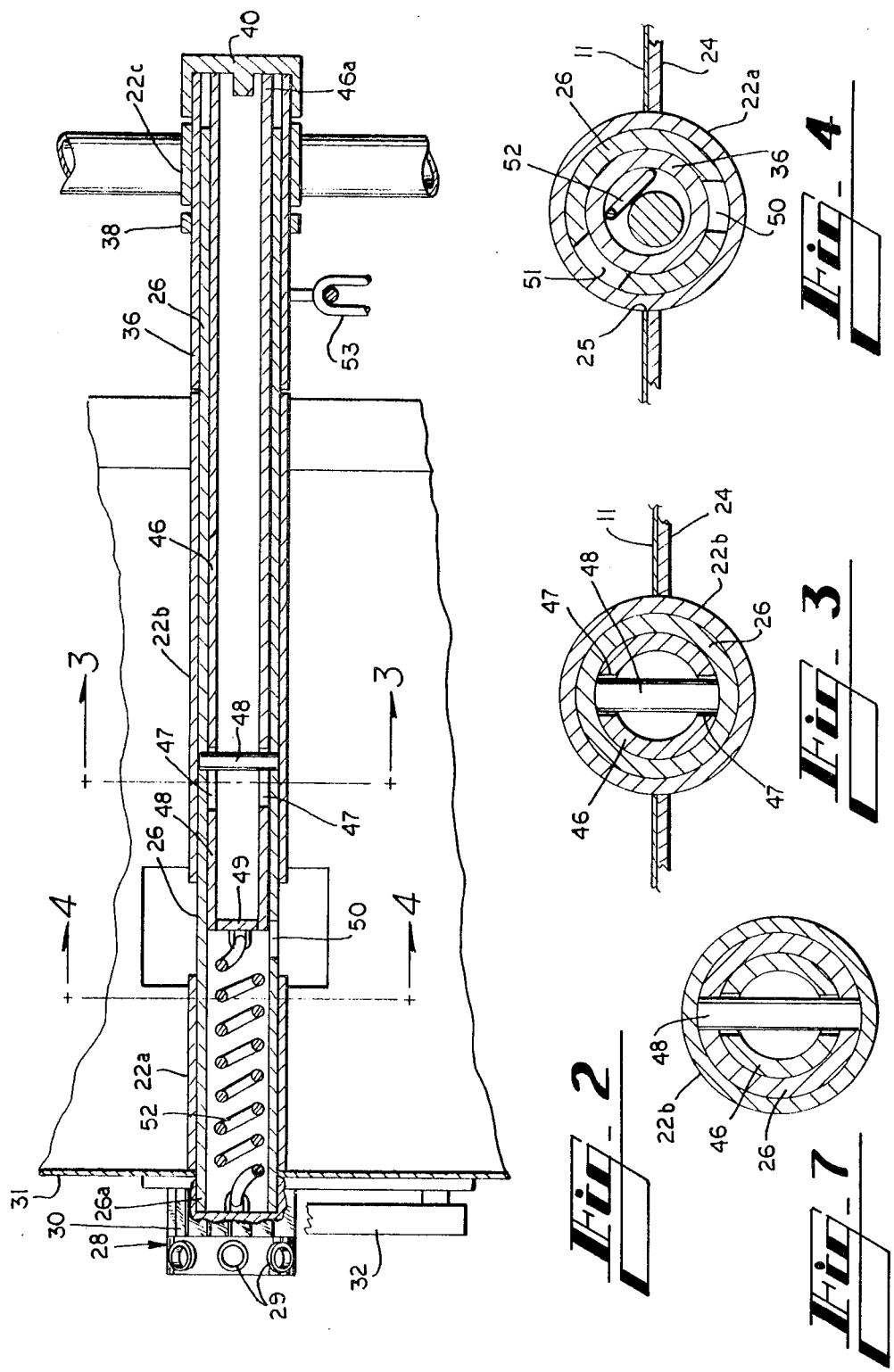

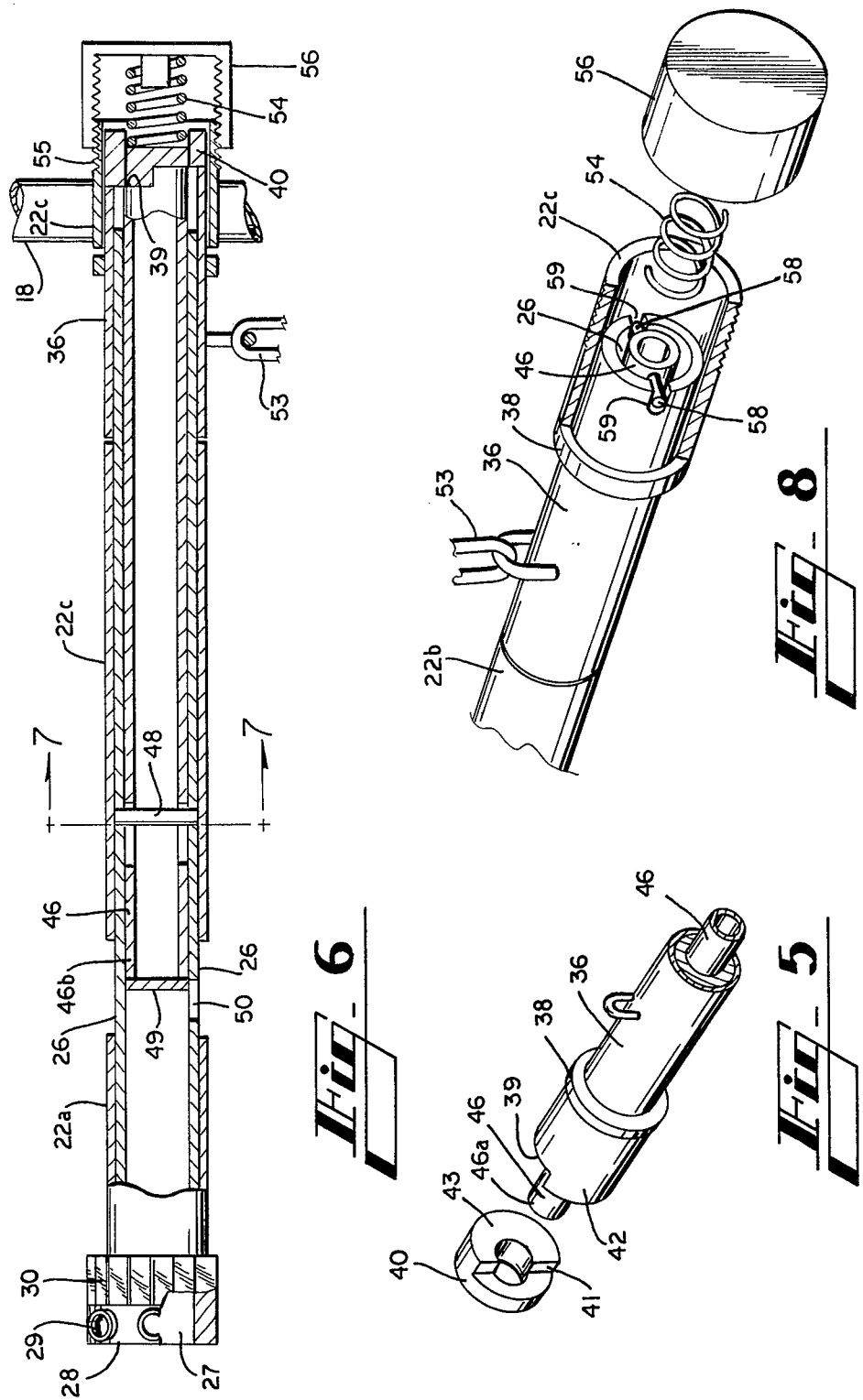

QUICK RELEASE WINCH TIE DOWN AND RAMP ASSEMBLY

TECHNICAL FIELD

This invention relates to the ramps of car hauler trailers, particularly to a tie down assembly for holding an automobile or the like on the ramp of a car hauler trailer so that the trailer can carry automobiles, etc. without having the automobiles fall off the trailer.

BACKGROUND

When cars, vans, pickup trucks etc. are placed on the ramps of a car hauler trailer and on the head ramp of the tractor that pulls the car hauler trailer, tie down chains are connected to the frame of each car, etc. adjacent each wheel of the car, and tension is applied to the chains so as to hold the car on the ramp and to reduce the weight of the car with respect to the ramp. The tension is usually applied by winding each tie down chain about a shaft.

In the past, tie down assemblies for car haulers and the like have included structures that comprise a sleeve mounted on or in the tracks of the ramp and a rotatable shaft extending through the sleeve. A ratchet and pawl allowed the shaft to rotate in one direction while preventing the shaft from rotating in the other direction, and the shaft included an enlarged head with sockets extending therethrough so that an operator could insert a tool through the sockets and crank or otherwise rotate the shaft. One end of the tie down chain was connected to the frame of a car and the other end was connected to the tie down shaft and the rotation of the shaft wound the chain about the shaft and effectively shortened the length of the chain to tie down the car.

While the prior art tie down assemblies for car haulers etc. have been functionally successful in that they securely tie down the vehicles carried by the car hauler trailer, substantial accident hazards are present with the prior art tie down assemblies. For example, when the cars, etc. are to be removed from the car hauler trailer, the operator usually cranks the crank shaft a little tighter so as to release the pawl from the ratchet and then attempts to unwind the crank shaft to progressively unreel the tie down chain. The operator must use one hand to crank the tie down shaft and the other hand to manipulate the pawl. In many instances the strength of the operator is insufficient to control the rotational movement of the crank shaft, whereupon his crank tool is flailed about by the rapid rotation of the crank shaft, causing injury to the operator. Also, it is difficult to control the position of the pawl, and occasionally the operator's thumb or fingers are caught between the ratchet and pawl.

SUMMARY OF THE INVENTION

Briefly described, the present invention comprises a quick release tie down assembly and a ramp for use on car hauler trailers and the like, wherein an operator can expediently and safely tie down and release cars on the ramps of the car hauler trailer. Four or more tie down assemblies are incorporated in each ramp or station for each car so that the car can be tied down adjacent each of its wheels. Each tie down assembly includes a cylindrical bearing sleeve extending across the wheel tracks of the ramp, a crank shaft extending from one end into the bearing sleeve and a tie down sleeve rotatably aligned with the longitudinal axes of the crank shaft and bearing sleeve, with a tie down chain connected to the tie down sleeve. Locking elements releasably lock the rotatable tie down member to the crank shaft, and a ratchet and pawl limit the rotation of the crank shaft to one direction. A spring biases the lock elements of the crank shaft and tie down sleeve toward engagement with each other so that when the crank shaft is rotated by the operator, the tie down sleeve also rotates and winds the tie down chain member about the tie down sleeve, thus effectively shortening the length of the tie down chain and tying down the car on the ramp.

When the car is to be removed from the ramp, the releasable lock elements are disengaged against the bias of the spring, and the tie down sleeve is free to rotate and unreel the tie down chain. The quick release of the tie down chain sleeve permits the springs of the vehicle to pull the chain until there is sufficient slack in the chain to permit the operator to disconnect the chain from the car.

Thus, it is an object of this invention to provide a quick release tie down assembly in combination with the ramp of a car hauler trailer wherein cars, vans, pickup trucks and other vehicles can be expediently and safely tied down on and released from the ramps of a car hauler trailer and tractor, substantially without hazard to the operator.

Another object of this invention is to provide an improved tie down assembly for the ramps of a car hauler trailer and the like which is inexpensive to construct, durable, expedient to manipulate and which can be manipulated substantially without hazard to the operator.

Other objects, features and advantages of the present invention will become apparent upon reading the following specification, when taken in conjunction with the accompanying drawings.

BRIEF DESCRIPTION OF THE DRAWINGS

FIG. 2 is a longitudinal cross-sectional illustration of the tie down assembly.

FIG. 3 is a cross-sectional illustration of the tie down assembly, taken along lines 3—3 of FIG. 2.

FIG. 4 is a cross-sectional view of the tie down assembly, taken along lines 4—4 of FIG. 2.

FIG. 5 is a perspective illustration of the tie down sleeve and lock elements, showing one lock element exploded away from the assembly and showing a portion of the release bar.

FIG. 6 is a side cross-sectional view, with parts broken away, of a modified tie down assembly.

FIG. 7 is a cross-sectional view of the modified tie down assembly of FIG. 6, taken along lines 7—7 of FIG. 6.

FIG. 8 is a perspective illustration of a second modification of the tie down sleeve and lock elements, showing the segment of the bearing sleeve in cross section and the spring and end cap exploded from the bearing sleeve.

DETAILED DESCRIPTION

Figure 1:
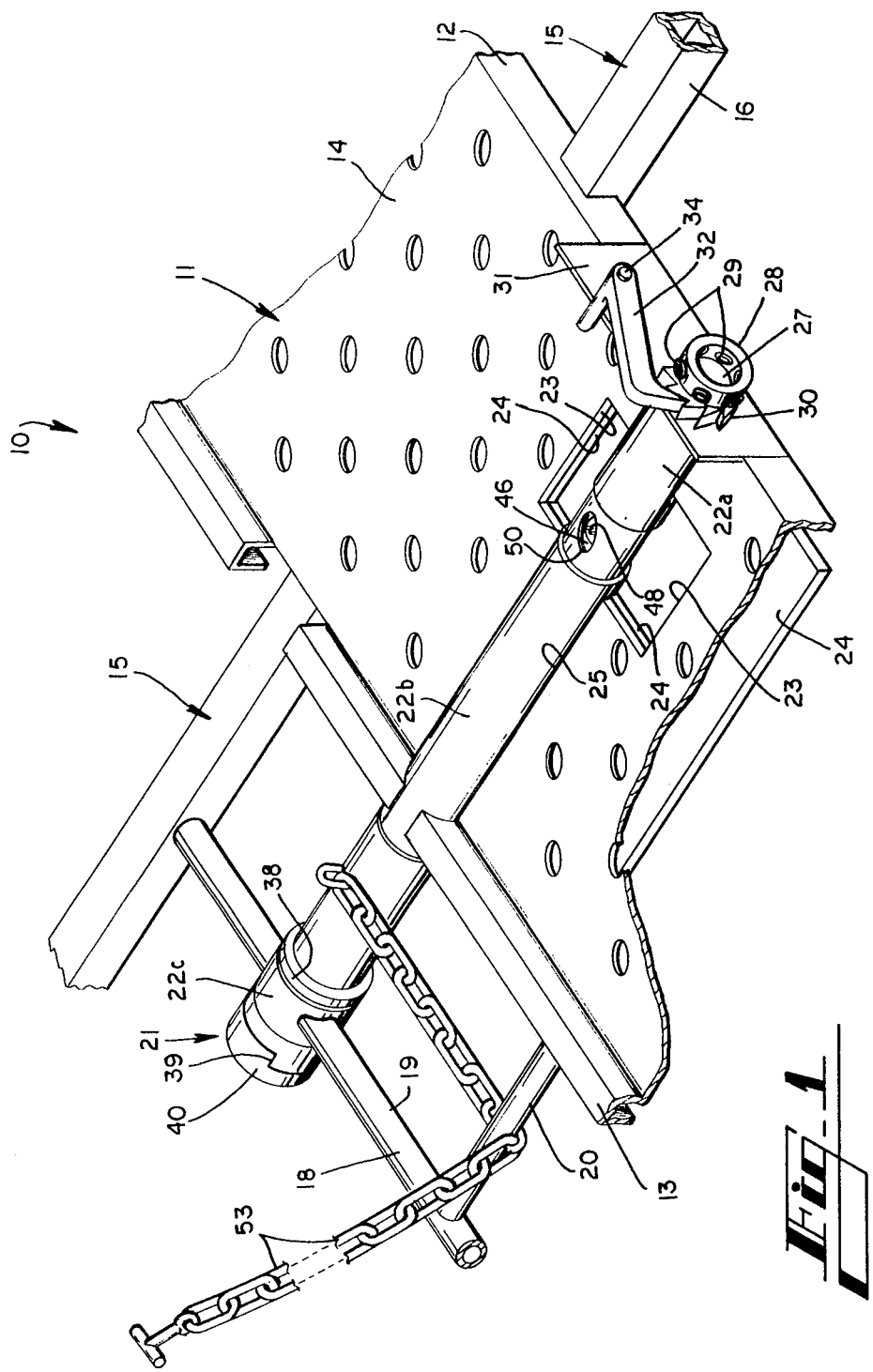
FIG. 1 is a partial perspective illustration of the tie down assembly and ramp.

Referring now in more detail to the drawings, in which like numerals indicate like parts throughout the several views, FIG. 1 illustrates a portion of a ramp 10 of a car hauler vehicle, specifically illustrating a segment of a wheel track 11 over which the wheels of one side of a car, pickup truck, van or other vehicle would move. The wheel track 11 is formed from punched sheet metal, including reinforcing edge strips 12 and 13, and cross bars 15. The cross bars 15 (only one is illustrated) are located at the forward and rear ends of the tracks 11 and connect the tracks together in the form of a ramp structure. The protruding ends 16 of the cross bar 15 are connected to various hydraulic cylinders, levers and other elements (not shown) of the car hauler vehicle so that the ramp is supported in the vehicle structure. A ladder 18 is located on the inside edge of each track 11 and includes longitudinal bar 19 and a series of laterally extending bars 20. The longitudinal bar 19 is connected to cross bars 15.

The winch tie down assembly 21 comprises a segmented bearing sleeve 22a, 22b and 22c which is mounted to the track 11 and longitudinal bar 18 of the ramp. The segments 22a-22c are cylindrical and their longitudinal axes are coincident. Bearing sleeve segment 22c is larger in diameter than segments 22a and 22b. The bearing sleeve segments 22a and 22b are first attached to at least one support plate 24 which functions to hold these bearing sleeve segments in alignment with each other and to support these segments. The support plates 24 and bearing sleeve segments 22a and 22b are rigidly mounted to track 11 of the ramp 10, as by welding. A slot 25 is formed in the tread 14 of the track 11 to receive the bearing sleeve segments 22a and 22b and the support plates 24 are welded to the bottom surface of the tread 14. An opening 23 is formed in the track 14 and in the support plates 24 and extends on opposite sides of the bearing sleeve at the position adjacent the space between bearing sleeve segments 22a and 22b. The third bearing sleeve segment 22c is mounted in the longitudinal bar 18, with the bar sections being butt welded to the bearing sleeve segment 22c and holding the bearing sleeve segment 22c in longitudinal alignment with the other bearing sleeve segments.

Crank shaft 26 is formed from tubular stock and is rotatably received within the aligned cylindrical openings of the bearing sleeve segments 22a, 22b and 22c. An enlarged crank shaft head 28 is rigidly connected to the end portion 26a (FIG. 2) of crank shaft 26 that protrudes from bearing sleeve segment 22a to the outside edge of ramp 10. Crank shaft head 28 includes a plurality of sockets or openings 29 into which the stem of a crank or other tool can be inserted for the purpose of rotating crank shaft 26. Also, a plurality of ratchet teeth 30 are formed on enlarged crank shaft head 28. Positioning plate 31 defines an opening therethrough (not shown) and the crank shaft 26 extends through the opening. The enlarged crank shaft head 28 is too large to move through the opening. Pawl 32 is pivotally mounted by means of its pivot pin 34 to positioning plate 31 and engages the ratchet teeth 30. Thus, the ratchet teeth 30 and pawl 32 function as ratchet and pawl means for limiting the rotation of crank shaft 26 in only one direction, and thus function as a restraining means.

Tie down sleeve 36 is longitudinally aligned with the bearing sleeve segments 22a, 22b and 22c and is located in the space between segments 22b and 22c. Crank shaft 26 extends through the longitudinal opening of the tie down sleeve 36. Tie down sleeve 36 extends through the large diameter bearing sleeve segment 22c. Annular retaining ring 38 is connected to and extends about tie down sleeve 36 and prevents tie down sleeve 36 from moving telescopically through bearing sleeve segment 22c.

As best illustrated in FIGS. 1, 2 and 5, the end of tie down sleeve 36 that protrudes beyond bearing sleeve segment 22c includes a semicircular notch 39. Lock cap 40 is positioned in alignment with tie down sleeve 36 and includes a semicircular notch 41 which corresponds in size and shape to the notch 39 of tie down sleeve 36. When the notches 39 and 41 are oppositely aligned, each notch accommodates the protruding portion 42 and 43 respectively of the tie down sleeve 36 and lock cap 40. Thus, the notched end portion of the tie down sleeve 36 is a first lock element, and the notched portion of lock cap 40 is a second lock element.

As illustrated in FIGS. 2 and 5, release shaft 46 extends concentrically through crank shaft 26, and one end portion thereof 46a is rigidly connected to lock cap 40. A slot 47 (FIGS. 2 and 3) is formed in release shaft 46. Retaining pin 48 extends through slot 47 of release shaft 46 and is rigidly anchored at its ends to crank shaft 26. Thus, release shaft 46 is nonrotatably connected to crank shaft 26, but the slot 47 permits release shaft 46 to move longitudinally or telescopically with respect to crank shaft 26.

The end 48 of release shaft 46 is positioned in the space between bearing sleeve segments 22a and 22b, and the end of release shaft 46 is closed with a plug 49. Slots 50 and 51 (FIGS. 2 and 4) are formed in crank shaft 26 at the gap between bearing sleeve segments 22a and 22b. Coil tension spring 51 is positioned in crank shaft 26, with one end of the spring 51 connected to crank shaft head 28 and with the other end of the spring connected to release shaft 46. Thus, release shaft 46 and its lock cap 40 are biased by the spring so that lock cap 40 remains in locking engagement with the semicircular notch 39 of tie down sleeve 36. Thus, the two lock elements 39 and 40 remain in locked engagement by spring 52.

Tie down chain 53 has one end portion thereof connected to tie down sleeve 36, and the free end thereof is available for connection to the frame of a car etc. The chain 53 can extend about one or more of the lateral bars 20 of the ramp 10 to reach to the frame of the car at the proper angle.

A second embodiment of the invention is illustrated in FIGS. 6 and 7, wherein the coil tension spring 52 of the first embodiment is omitted and a coil compression spring 54 is substituted therefor. The bearing sleeve segments 22a, 22b and 22c receive the crank shaft 26 and release shaft 46 and these elements are telescopically connected together by retaining pin 48, as in the first embodiment of the invention. However, the bearing sleeve segment 22c includes external threads 55 and cap 56 is threaded onto the threads 55. Coil compression spring 54 bears between cap 56 and lock cap 40, urging the lock cap 40 into engagement with the semicircular notch 39 of tie down sleeve 36.

A third embodiment of the invention is illustrated in FIG. 8, wherein the lock elements are modified. The end portion of release shaft 46 has openings formed therein and a lock pin 58 extends through the openings. Notches 59 are formed in the end surface of tie down sleeve 36 and the notches are sized and shaped to receive the lock pin 58. When spring 54 urges the release shaft 46 and lock pin into tie down sleeve 36 so that the pin 58 is in the confines of the notches 59, the tie down sleeve 36, release shaft 46 and crank shaft 26 are rotatably locked together. However, when the release shaft 46 is moved against the bias of spring 54 a distance sufficient to move lock pin 58 beyond notches 59, tie down sleeve 36 is free to rotate. Thus, lock pin 58 functions as a first lock element and the notches 59 function as a second lock element.

OPERATION

When it is desired to tie down a car or other vehicle on the ramp 11, the car is driven onto the ramp with the wheels on each side of the car moving on a track 11 until the car is properly located. Four or more tie down assemblies 21 are located on the ramp with each tie down assembly positioned adjacent the expected wheel location of the vehicle to be tied down. The tie down chains 53 can be threaded beneath one or more of the lateral bars 20 of the ladder 18 of each track 11 in order to properly locate the chain with respect to the frame of the car, and the free end of the chain is connected to the frame of the car. The operator then inserts an elongated tool bar into one of the sockets 29 of the enlarged crank shaft head 28 and rotates the crank shaft. The ratchet 20 and pawl means 30, 32 permits the crank shaft to be rotated in one direction and restrains the crank shaft from being rotated in the opposite direction. As the crank shaft is rotated, the retaining pin 48 causes the release shaft 46 to rotate in unison with the crank shaft 26, and the release shaft therefore rotates lock cap 40. The spring 52 (or 54 of the second embodiment) urges the lock cap 40 into engagement with the semicircular notch 39 of the tie down sleeve 36, thereby causing the tie down sleeve 36 to rotate in unison with the crank shaft. This causes chain 54 to be reeled about the tie down sleeve 36, effectively shortening the length of the chain and tying down the vehicle on ramp 10. The ratchet and pawl means prevents the chain from unreeling. The operator repeats this procedure with respect to each tie down assembly to tie down the cars at four positions about each car.

When the operator is to release the cars, he inserts a tool through one of the slots 50 or 51 of the crank shaft 26 and engages the end portion 46b of release shaft 46 and wedges the release shaft 46 against the bias of its spring 52 (or spring 54 of the second embodiment), thereby moving lock cap 40 away from the semicircular notch 39 of tie down sleeve 36. This effectively releases tie down sleeve 36 so that it is free to rotate. The springs of the car to which the tie down chain 54 is connected exert sufficient tension in the chain so that the chain tends to rotate tie down sleeve 36 and unreel itself from about the tie down sleeve. The sudden release of the tie down chain 54 and the force exerted by the springs of the car are sufficient to permit the tie down chain 54 to become slack and little or no further rotation of the tie down sleeve 36 is required. The operator then removes the chain from about the vehicle frame. This procedure is repeated for each tie down assembly.

With respect to the second and third embodiments of the invention (FIGS. 6-8), the tool used to release the vehicles also can be inserted in and pushed through the opening 27 formed in the enlarged crank shaft head 28 until the tool engages the end of and moves release shaft 46 longitudinally to disconnect the lock elements 39 and 40 or 58 and 59.

The opening 23 in track 14 permits the operator to insert his tool into the slot 50 even when the slot 50 is facing the edge of the track. Also, the slots 50 and 51 are exposed in a downward direction when facing downwardly, and the operator is able to reach in an upward direction with his tool from beneath the track to release the tie down chain. This is a desirable feature for the upper ramps of the trailer so that the operator can release the vehicle without having to climb up the side of the trailer.

It will be understood that the foregoing relates only to preferred embodiments of the present invention, and that numerous changes and modifications may be made therein without departing from the spirit and the scope of the invention as set forth in the following claims.

I claim:

1. A tie down for car hauler vehicles comprising an outer bearing sleeve for mounting to the ramp of a vehicle, a cylindrical crank shaft extending through said bearing sleeve, a ratchet attached to said crank shaft and a pawl arranged to engage said ratchet to prevent rotation of said ratchet and said crank shaft in one direction while permitting rotation of said crank shaft in the other direction, a release shaft extending through said crank shaft and having one end thereof protruding from said crank shaft, a first lock member mounted on the protruding end of said release shaft, a tie down sleeve extending about said crank shaft and said release shaft and including a second lock member mounted on one end thereof for engagement with said first lock member, spring means for urging said first lock member into engagement with said second lock member whereby said release shaft and said tie down sleeve are locked together and are rotatable in unison, and connector means for connecting said crank shaft and said release shaft in telescopic relationship for rotation together, a tie down chain means having an end portion thereof connected to said tie down sleeve with its other end portion being connectable to an automobile carried on the ramp, said crank shaft defining an opening therein through which said release shaft can be engaged and moved longitudinally whereby when the tie down chain means is connected to an automobile on the ramp to which the tie down is mounted and the crank shaft is rotated, the release shaft, both lock members, and the tie down sleeve also rotate to wrap the tie down chain means about the tie down sleeve and effectively shorten the tie down chain means and urge the automobile to which the tie down chain means is connected toward the ramp, and when the release shaft is moved longitudinally with respect to the crank shaft the lock members disengage and the tie down sleeve is free to rotate about the crank shaft and the release shaft so that tension in the tie down chain means causes the tie down sleeve to rotate an unreel and tie down chain means from about the tie down sleeve.

2. The tie down of claim 1 and wherein said spring means comprises a coil tension spring connected between said crank shaft and said release shaft for urging said first and second lock members into engagement with each other.

3. The tie down of claim 1 and further including a cap member mounted on one end of said bearing sleeve, and wherein said spring means comprises a compression spring member bearing against said cap member and one of said lock members for urging said lock members into engagement with each other.

4. The tie down of claim 1 and wherein said bearing sleeve is divided into a plurality of concentric segments defining spaces between the segments, and said tie down sleeve is positioned in one of the spaces between the segments of said bearing sleeve.

5. The tie down of claim 1 and wherein said bearing sleeve is divided into a plurality of concentric segments defining spaces between the segments, and one end of said release shaft in said crank shaft is positioned in a space between the segments of said bearing sleeve, and said opening of said crank shaft is positioned at the inner end of said release shaft whereby a tool can be inserted through the opening of said crank shaft against the inner end of said release shaft to move the release shaft longitudinally with respect to said crank shaft.

6. A ramp assembly for a car hauler vehicle including in combination a pair of spaced parallel tracks for supporting the wheels of a car, the combination therewith of each track including at lest one tie down assembly for holding the car on the ramp assembly, each of said tie down assemblies comprising an outer bearing sleeve mounted to its track, a crank shaft rotatably received in said bearing sleeve, retaining means for preventing rotation of said crank shaft in one direction while permitting rotation of said crank shaft in the other direction, a tie down sleeve rotatable about said crank shaft, a release shaft positioned within said tie down sleeve and telescopically connected to said crank shaft for rotation with said crankshaft, a first lock member mounted on said release shaft, a second lock member mounted on said tie down sleeve, spring means biasing said first and second lock members toward locked engagement with each other, means for releasing said tie down sleeve from said crank shaft, and a tie down chain member connected at one of its end portions to said tie down sleeve, whereby when the first and second lock members are locked together and when the tie down chain member is connected to a car on the ramp and the crank shaft is rotated the tie down sleeve also rotates and winds the tie down chain member about the tie down sleeve and effectively shortens the tie down chain member to urge the car toward the ramp, and when the first and second lock members are disengaged against the force of the spring means the tie down sleeve is disconnected from the crank shaft and the tie down sleeve is free to rotate with respect to the crank shaft and the tension in the tie down chain member rotates the tie down sleeve to unwind the tie down chain member from about the tie down sleeve.

7. The ramp assembly of claim 6 and wherein the crank shaft of each of said tie down assemblies includes a crank receptacle positioned at the outside edge of its track and wherein the first and second lock elements are positioned at the inside edge of each track.

8. The ramp assembly of claim 6 and wherein said retaining means for preventing rotation of said crank shaft in one direction comprises a ratchet mounted on said crank shaft and a pawl arranged to engage said ratchet.

9. The ramp assembly of claim 6 and wherein said crank shaft is cylindrical with an opening extending therethrough and is coaxial with said bearing sleeve, and wherein said release shaft is positioned inside and protrudes from an end of said crank shaft.

10. A ramp assembly for a car hauler vehicle including a pair of spaced parallel tracks for supporting the wheels of a car the combination therewith of each track including at least one tie down assembly for holding a car on the ramp assembly, each said tie down assembly including a bearing sleeve rigidly mounted to its track, a crank shaft extending through said bearing sleeve, a tie down sleeve positioned coaxially with said crank shaft, releasable lock means for releasably locking said crank shaft and said tie down sleeve together, said releasable lock means comprising a lock member carried by said tie down sleeve, a release shaft including a lock member for locking engagement with the lock member of said tie down sleeve, said release shaft positioned coaxially with respect to said crank shaft and within said tie down sleeve and movable lengthwise with respect to said crank shaft for rotation with said crank shaft to position its lock member into and out of locking engagement with the lock member of said tie down sleeve, spring means normally urging said lock members into locking engagement with each other, means for moving said release shaft longitudinally with respect to said tie down sleeve to disengage said lock members, ratchet and pawl means for limiting the rotational movement of said crank shaft in one direction of rotation, and a tie down chain member having an end portion connected to said tie down sleeve.

11. The invention of claim 10 and wherein said tie down sleeve is positioned about said crank shaft.

12. The invention of claim 10 and wherein said crank shaft includes a crank receptacle on one side of the track and wherein said releasable lock means is positioned on the other side of the track.

13. The invention of claim 10 and wherein said bearing sleeve is divided into coaxial segments and wherein said tie down sleeve is mounted about said crank shaft in a space between the segments of said bearing sleeve.

14. A tie down for holding a car on the ramp of a car hauler vehicle comprising a bearing sleeve assembly including at least two cylindrical bearing sleeve segments in longitudinal alignment with each other and at least one support plate rigidly connected to and maintaining said bearing sleeve segments in alignment with each other and for mounting the tie down to a ramp of the car hauler vehicle, a cylindrical crank shaft extending through the longitudinal openings of said bearing sleeve segments and rotatable with respect to said bearing sleeve segments, a ratchet and pawl means for preventing rotation of said crank shaft in one direction of rotation with respect to said bearing sleeve segments and allowing rotation of said crank shaft in the other direction of rotation with respect to said bearing sleeve segments, a tie down sleeve positioned coaxially about said crank shaft and positioned in a space between said bearing sleeve segments and rotatable with respect to said crank shaft, releasable lock means for releasably connecting said crank shaft and said tie down element, said releasable lock means comprising a release shaft positioned in said crank shaft and movable along the length of said crank shaft for rotation with said crank shaft and including an end portion protruding from an end of said crank shaft, a first lock element at the protruding end of said release shaft, and tie down sleeve including a second lock element, spring means arranged to urge said release shaft along its length until said lock elements are in locking engagement with each other so that said tie down sleeve and said crank shaft are locked together, said crank shaft defining an opening in its side portion at a position between bearing sleeve elements which exposes said release shaft to the outside of the tie down for engagement by an actuating tool, a tie down chain member having one end portion connected to said tie down element and the other end free for connection to a car on the ramp of the car hauler, whereby when the releasable lock means is connected between said crank shaft and said tie down element and the crank shaft is rotated the tie down sleeve rotates in unison therewith to reel the tie down chain member about the tie down sleeve, and when the releasable lock means is disconnected between said crank shaft and said tie down sleeve the tie down sleeve is independently rotatable with respect to said crank shaft and said bearing sleeve elements and any tension applied to the tie down chain member rotates said tie down sleeve and unreels the tie down chain member from about the tie down sleeve.

* * * * *